July 23, 1957   J. W. CROWNOVER   2,800,551
RELAY

Filed Sept. 17, 1953   2 Sheets-Sheet 1

INVENTOR
JOSEPH W. CROWNOVER
BY

ATTORNEYS

July 23, 1957 J. W. CROWNOVER 2,800,551
RELAY
Filed Sept. 17, 1953 2 Sheets-Sheet 2

INVENTOR
JOSEPH W. CROWNOVER
BY
Mason & Graham
ATTORNEYS

United States Patent Office 2,800,551
Patented July 23, 1957

2,800,551

RELAY

Joseph W. Crownover, Sherman Oaks, Calif., assignor, by mesne assignments, to Electric Machinery Mfg. Company, a corporation of Minnesota Application September 17, 1953, Serial No. 380,785

31 Claims. (Cl. 200—87)

This invention relates to relays, particularly to that type of relay in which the actuating force utilized in moving the contact lever of the relay unit is supplied by an electrostrictive element such as an electrostrictive titanate bender element which undergoes bending displacement when a potential difference is applied thereto.

It is an object of the invention to provide a novel relay, actuated by a bender element of the electrostrictive type, in which there is provided a novel means for supporting the bender element and transmitting the displacement thereof to the movable arm of the relay unit in such a way that maximum displacement may be imparted to the movable arm.

It is another object to provide a novel relay unit, actuated by a bender element of the electrostrictive type, in which there is provided a novel means for supporting the bender element within the relay housing in such a way that twisting of the housing, such as is likely to occur in normal usage, will not cause displacement of the bender element, to the end that inadvertent actuation of the relay will be precluded.

It is another object to provide a novel relay unit, actuated by a bender element of the electrostrictive type, in which there is provided a novel means for adjusting the position of the bender element with respect to the relay housing with the result that optimum initial tension and bending in the relay actuating and connecting members may be readily obtained, so that electrostrictive displacement of the bender element may be efficiently utilized in displacing the movable contact of the relay.

It is a further object to provide a novel relay, actuated by a bender element of the electrostrictive titanate class, in which the movable relay components are disposed to co-act in such a way that relay actuation will not be caused by shock loading or rapid physical acceleration of the relay unit.

It is yet another object of the invention to provide a novel electro-thermal relay, actuated by a bender element of the electrostrictive titanate class, in which flexing of the bender element due to temperature changes is controlled by an applied potential difference, to the end that the temperature at which relay actuation occurs may be accurately controlled.

These and other objects and advantages of the present invention will become apparent from a consideration of the following description and the appended claims in conjunction with the accompanying drawings wherein:

Figure 1:
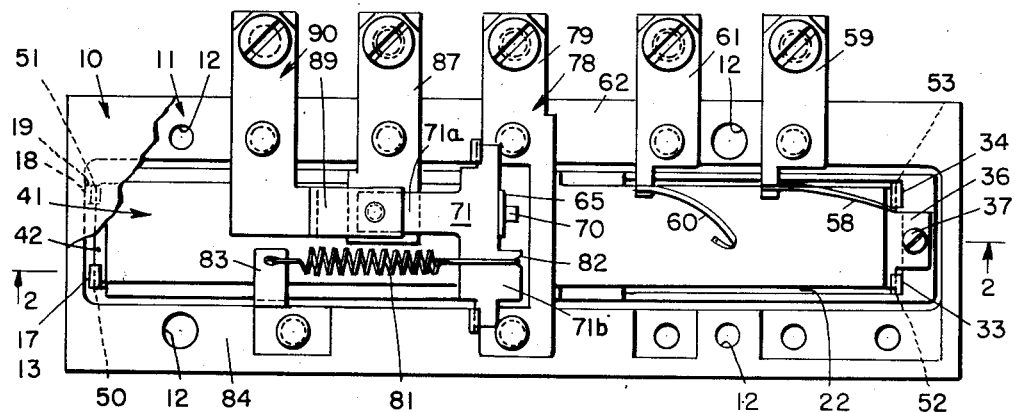
Fig. 1 is a plan view of the relay unit mounted in the lower housing member, the cover being broken away.

Referring now to Figs. 1 through 5, the numerals 10 and 11 designate respectively the upper and lower housing members which are coextensive in length and are adapted to be joined together by means of screws, not shown, extending through drilled holes 12 in the housing members. The elongated lower housing member encloses a chamber 13 in which there is positioned an elongated support member 14, preferably metallic. The latter may be a channel member, as shown, having an intermediate section or web 15 and opposite side members 16. Two spaced supporting elements, such as V-shaped supporting clips 17 and 18, extend upwardly from the left end of support member 14, the apex of each clip extending leftwardly toward the end wall 19 of the housing member 11. Part of the web 15 located between the right end portion 20 of the channel member and the mid portion thereof is removed so as to form an apertured or open area 22.

A second support member 24, which may be an elongated resilient strip of metal, is fastened to the support member 14 approximately half way between the ends thereof, as by means of rivets 25 and 26 located on a line transverse to the longitudinal direction of support member 14. The rivets also serve to fasten or join the two support members to the lower housing member, the latter having a plateau portion 27 for this purpose so that only a small portion of the support member 14 actually abuts the housing member. Preferably the portion 29 of the web section 15 of support member 14 is dished downwardly, as is adjoining portion 30 of strip 24, to receive the two rivets 25 and 26 as described. The lower housing member has appropriately shaped holes 31 to receive the rivets and the dished portions of members 14 and 24.

With rivets 25 and 26 rigidly joining the supporting members 14 and 24 to the housing, these two members are mounted as oppositely extending cantilevers. Support strip 24 extends rightwardly from the rivets toward the right end wall 32 of the housing 11, and two spaced clips 33 and 34 are joined to the rightward portion 35 thereof. The clips are V-shaped and extend upwardly from the portion 35 of the strip 24, with the apex of each clip extending rightwardly toward the end wall 32. A horizontal tongue 36 spaced upwardly from portion 35 of strip 24 also extends rightwardly therefrom. Tongue 36 is positioned directly above the horizontal web portion 20 of support member 14 and is spaced therefrom. Web portion 20 contains a threaded aperture positioned directly below a drilled hole in tongue 36, and adjustment means for support member 14, comprising a screw 37, is fitted through the aperture in the tongue, and engages the threaded aperture in web portion 20. When the screw 37 is tightened downwardly, the right end 35 of flat supporting strip 24 is biased downwardly into the open area 22, the lip 40 of web 15 serving as a fulcrum about which downward bending of portion 35 of strip 24 takes place. Thus the support strip 24 and the V-shaped clips 33 and 34 thereon may be raised or lowered by the screw adjustment means.

Freely supported between the pairs of clips 17 and 18, and 33 and 34 is an elongated bender unit 41, preferably of the electrostrictive titanate transducer class, Such a bender unit is described in my co-pending applications, Serial No. 369,123, filed on July 20, 1953 and entitled "Piezoelectric Transducer," and Serial No. 357,132, filed on May 25, 1953 and entitled, "Piezoelectric Relay." For purposes of illustration, the bender unit 41 comprises a thin, elongated center electrode 42 having thin electrostrictive titanate strips 43 and 44 fastened to opposite sides thereof, as by cementing or bonding the titanate strips thereto. The preferred titanate material comprises a polycrystalline aggregate of barium titanate or strontium titanate, or a mixture thereof, bonded together with a ceramic binder in a manner well known in the art. Such a ceramic material is capable of exhibiting an induced mechanical strain as the result of the application of voltage across a portion thereof. The two outer surfaces 45 and 46 of the titanate strips 43 and 44 are made electrically conducting as by applying a thin coat of silver paint thereto. The center electrode 42 may comprise any conductive metallic material such as brass; however, it preferably comprises a material such as an iron-nickel alloy having a thermal coefficient of expansion approximately equal to that of the titanate strips, for thermal stability.

The opposite ends of electrode 42 have tongues 48 and 49 formed thereon in such a manner that the tongues project outwardly toward the end walls 19 and 32 of the housing 11, between the clips 17 and 18, and 33 and 34. Spaced shoulder portions 50 and 51, and 52 and 53, adjacent the respective tongues 48 and 49, engage the notches provided by the respective pairs of V-shaped clips 17 and 18, and 33 and 34 in such a manner that the clips resiliently bend outwardly to a slight extent toward the end walls of the housing, and thus act to freely support the bender unit 41 therebetween. The term "freely support" describes the ability of the supporting means such as the clips to retain the bender unit 41 supported in space between the clip pairs while permitting the bender unit to flex or bend freely in space therebetween. In other words, the opposite ends of the bender unit are restrained against bodily displacement, yet the ends may hinge in position within the V-shaped notches provided by the clips. No portion of the bender unit is gripped and used as a reaction member in facilitating bending, as in a cantilevered arrangement. The center electrode 42 of the bender unit has the center portion thereof removed to form a slot 55 therein (Fig. 3), leaving the side portions or legs 56 and 57 extending longitudinally between the opposite end portions of the electrode. Electrode 42 is preferably constructed in this way in order to minimize the bending stiffness thereof, and thereby to facilitate maximum bending displacement.

Figure 2:
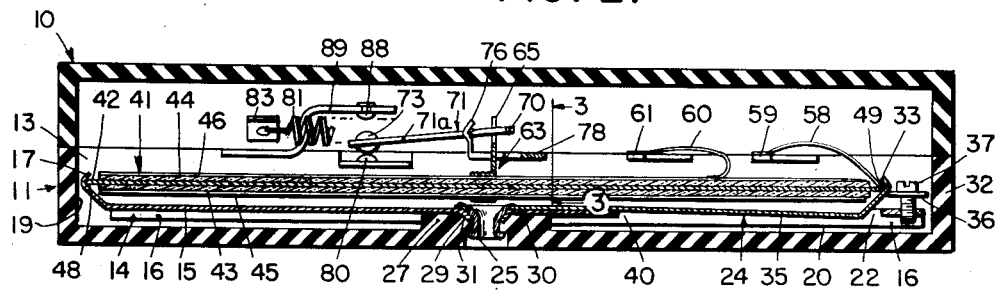
Fig. 2 is a cross sectional view of the relay unit taken on line 2—2 of Fig. 1.
Figure 3:
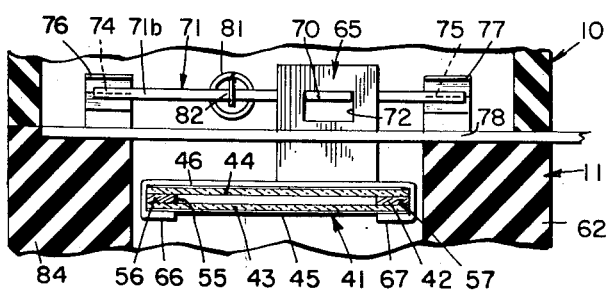
Fig. 3 is a cross sectional view of a portion of the relay unit taken on line 3—3 of Fig. 2, but on a larger scale.
Figure 4:
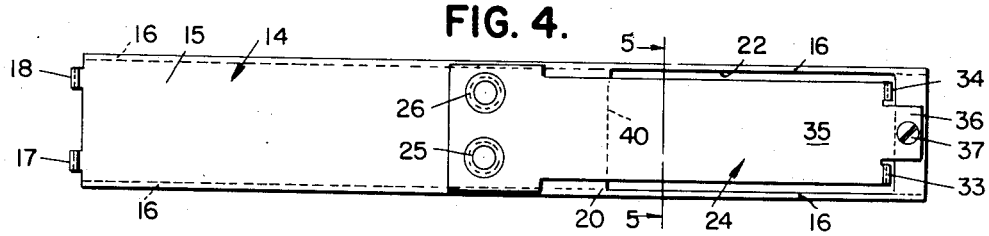
Fig. 4 is a plan view of a supporting member for the bender unit.
Figure 5:
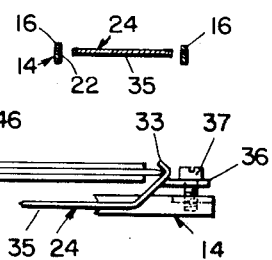
Fig. 5 is a cross sectional view of the supporting member for the bender unit, taken on line 5—5 of Fig. 4.

Bender unit 41 is caused to flex by applying a potential difference between the center electrode 42 and either one of the conductive surfaces 45 or 46 of the titanate strips. As shown in Fig. 2, one end of a wire lead 58 is joined to the tongue 49 of the center electrode, and the opposite end of the lead is soldered to a terminal 59. A second wire lead 60 extends between the conductive surface 46 of upper titanate strip 44, and the terminal 61. The two terminals are riveted to the side wall 62 of housing 11, and extend outwardly therefrom for convenience in attaching a source of electrical potential thereto. When such a potential is applied across the titanate strip 44, the thickness dimension of the strip expands slightly, causing the length and width dimensions thereof to contract. Contraction of the length dimension of the strip is opposed by the resistance to compression offered by the center electrode 42 to which strip 44 is bonded, and also by the compressive resistance of titanate strip 43. As a result, the bender unit will flex or bend downwardly toward the rivets 25 and 26, with the maximum displacement thereof occurring at the center portion 63.

A connection means such as link 65 is joined to the center portion 63 of bender unit 41 as by means of bracket arms 66 and 67 extending around the sides of the bender unit. To realize the advantages of the relatively great displacements undergone by central portions of the bender unit 41, the link 65 may be joined to the unit anywhere within the mid one-half of the length of the bender unit, that is, anywhere between limits defined by the two points which are located on the bender unit a distance inward from the ends thereof equal to one-quarter of the length of the unit. The displacements undergone by portions of the mid one-half of the bender unit are at least equal to 75% of the maximum displacement at the center of the unit, and therefore the link 65 may be joined conveniently to the bender unit anywhere within the mid one-half of the length thereof without losing a material percentage of realizable displacement.

The link 65 extends upwardly from the bender unit, and is adapted to receive and engage a tongue 70, forming a part of the relay armature 71, within a slot 72 formed in the upper end portion of the link. The contact arm portion 71a of the armature has an electrical contact 73 formed thereon. The armature 71, which comprises a flat metallic member, extends generally parallel to the bender unit 41, and carries a pair of laterally spaced knife edges 74 and 75 which are adapted to engage V-shaped notches defined by laterally spaced V-shaped clips or supporting elements 76 and 77, which extend upwardly from terminal bracket 78. The latter extends laterally across the housing 11, and is riveted to the side walls thereof. A portion 79 of terminal bracket 78 projects outwardly from the housing wall 62, and forms a convenient outer terminal to which electrical wiring may be attached.

The armature 71 is biased counterclockwise, in Fig. 2, against fixed contact 80 by a longitudinally extending tension spring 81, which is laterally offset from arm portion 71a. One end of the spring engages a notch 82 in armature body portion 71b which is rightwardly offset from a transverse line running through the fulcrumed knife edges 74 and 75, shown in Fig. 3, and the opposite end of the spring is fastened to a fixed arm 83 which is riveted to the housing wall 84. The line of action of the spring lies above the knife edges 74 and 75 so that the contact arm is pivotally urged counterclockwise and the movable contact 73 urged toward fixed contact 80 at all times. The fixed contact 80 is mounted on terminal 87 which is riveted to housing wall 62, and has a portion extending outwardly therefrom. The opposite fixed contact 88 is mounted on arm 89 which is spaced above contact 80, and extends downwardly to join terminal 90, which also is riveted to housing wall 62, and also has a portion extending outwardly therefrom.

Figure 6:
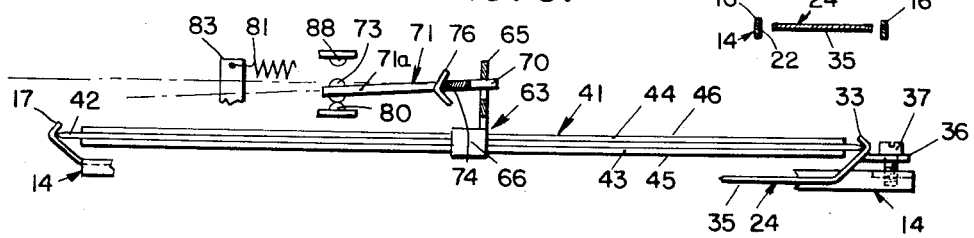
Fig. 6 is an elevational view of the operating components of the relay unit before actuation thereof.
Figure 7:
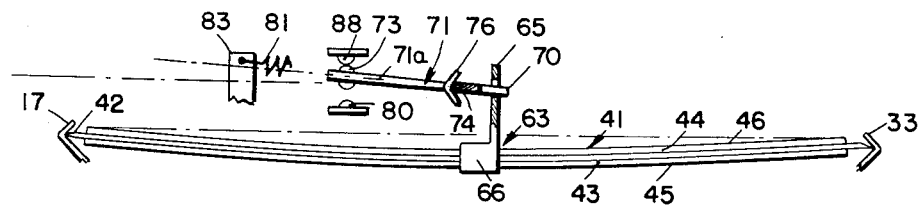
Fig. 7 is an elevational view of the operating components of the relay unit after actuation thereof.

The action of the relay is best illustrated in Figs. 6 and 7, showing the relative positions of the relay components before and after relay actuation. With no voltage applied across the titanate strip 44, the spring 81 urges the contact arm 71a counterclockwise, causing engagement of movable contact 73 with fixed contact 80, as shown in Fig. 6. The adjusting screw 37 is tightened downwardly, moving the right end 35 of the supporting strip and the supporting V-shaped clip 33 downwardly. The right end of the bender unit 41 is thus lowered, and the link 65 also moves downwardly, tending to rotate arm 71a clockwise. The adjustment is continued until any slack in the system of moving components is removed, that is, until the system of movable components is operatively taut; however, the adjustment is discontinued before the movable contact 73 is moved off fixed contact 80. When a voltage difference is applied between conducting surface 46 of the titanate strip and the electrode 42, the bender unit 41 immediately bends downwardly, as illustrated in Fig. 7, displacing the link 65 and rotating the movable contact off fixed contact 80 and into engagement with upper fixed contact 88. In doing so, the bender unit is free to bend downwardly to the maximum extent, no parts thereof being restrained against such bending by supporting elements. Thus a maximum downward pull on link 65 is exerted by the bender unit.

It will be understood that the spacing between the fixed contacts 80 and 88, and the distances between the notch 82, the knife edges 74 and 75, and the movable contact 73 are so adjusted that the movable contact 73 comes into engagement with upper fixed contact 88 while the clockwise moments of force exerted on armature 71 by the bender unit are greater than the counterclockwise moments of force exerted thereon by the spring 81; and therefore pressural engagement between contacts 73 and 88 will be maintained as long as the voltage difference is applied to the bender unit. When the voltage is removed therefrom, the spring 81 will of course move the contact 73 back into engagement with lower fixed contact 80 since the bender unit will cease to bias link 65 downwardly.

It will be noted that inadvertent longitudinal twisting or warping of the housing 11 is precluded from affecting relay actuation through displacement of the bender unit supporting members 14 and 24, since the latter are both anchored to the housing 11 at one place only, namely, the position of the laterally disposed rivets 25 and 26. In addition, the support members 14 and 24 are conveniently disposed on only one side of the bender unit 41 so as not to interfere with displacement of the link 65 and operation of the relay.

It is seen that the approximately parallel arrangement of the bender unit, the spring 81, and the relay armature 71 contribute materially toward the ability of these movable relay components to resist displacement and resultant inadvertent relay actuation due to acceleration of their masses, in the plane of Fig. 6. In particular, the approximately parallel arrangement of the spring 81 and the contact arm 71a permit the masses of these elements to be longitudinally distributed in such a way as to allow an approximate inertial balance about the transverse pivot line through the apexes of the V clips 76 and 77. The body portion 71b of the armature 71 is itself inertially balanced about the same pivot line since the pivot line runs through the center of mass of body portion 71b. Acceleration in the direction perpendicular to the bender unit in the plane of Fig. 6 will give rise to a certain amount of unbalance due to inertial bending of the bender unit 41, which is transmitted to armature 71. Such unbalance may be removed from the relay unit by the means shown and described in Fig. 8.

Figure 8:
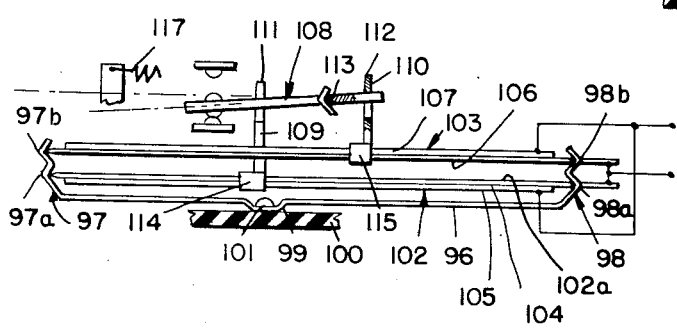
Fig. 8 is an elevational view of another form of the present invention showing the relationship of the components thereof before relay actuation.

A modified relay unit is schematically illustrated in Fig. 8. The unit includes a one-piece channeled supporting member 96 having pairs of V-clips 97 and 98 extending upwardly from both ends thereof. The supporting member 96 has a dished portion 99 which is anchored to the housing 100 by means of the rivet 101. The V-clips include vertically spaced V-sections 97a, 97b, and 98a and 98b, adapted to hingedly support two similar bender units 102 and 103 therebetween. Lower unit 102 includes an electrode 102a, similar to center electrode 42 described above, to the lower surface of which there is bonded a titanate strip 104 having the outer surface 105 thereof silvered. The upper bender unit 103 also includes an electrode 106, and a titanate strip 107 is bonded to the upper surface thereof, strip 107 having its upper surface silvered.

Both bender units 102 and 103 are independently connected to the armature 108 by means of connecting members or links 109 and 110, with the links 109 and 110 joining armature 108 at points 111 and 112 respectively. Points 111 and 112 are located on opposite sides of pivot point 113 and are equidistant therefrom. Also, the links join the bender units 102 and 103 at points 114 and 115 which may be the mid-points of the bender units or else equidistant therefrom, as illustrated. The distinct advantage of this arrangement lies in the balancing effected thereby. When the relay unit is accelerated in the direction perpendicular to the longitudinal direction of the bender units 102 and 103, the bender units will tend to flex together in the same direction and in an equal amount; however, the net effect of such bending on the armature 108 will cancel out since the moments of force exerted on the armature by the links 109 and 110 and taken about the pivot point 113 will be equal and opposite.

When a potential difference is applied at each bender unit, across the thickness dimension of the titanate strips, the upper bender unit 103 will flex downwardly, while the lower unit 102 will bend upwardly, setting up two clockwise moments of force at armature 108 which overcome the counterclockwise moment of force exerted thereon by the spring 117. Thus relay actuation will be effected. It will be realized that the bender units 102 and 103 may be made similar to bender unit 41 described above.

Another advantage of the two bender units in Fig. 8 lies in the fact that each of the units may be made considerably smaller, since each unit need only contribute one-half of the bending force required to actuate the relay. Thus, the length of the bender units may be considerably reduced, contributing toward a more compact relay unit.

Figure 9:
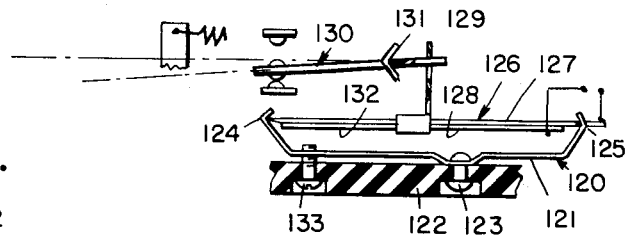
Fig. 9 is an elevational view of another relay unit showing the relationship of the components thereof before actuation.

Another modified relay unit is illustrated in Fig. 9. The unit includes a one-piece channeled support member 120 having one portion 121 thereof anchored to the housing 122 by means of rivet 123. V-shaped clips 124 and 125 extend upwardly from opposite ends of the member 120, and hingedly support the bender unit 126 therebetween. The bender unit includes an electrode 127, having only one titanate strip 128 bonded to the lower face thereof. A link 129 connects the bender unit to the portion of the armature 130 lying to the right of the pivot 131. The link is shown joined to the bender unit 126 at a point between the left end and the midpoint thereof, but closer to the latter than to the former. In other words, the link is joined to the bender unit at a point within the mid one-half of the length of the bender unit in order to realize near maximum displacement.

The point at which the support member 120 is anchored to the housing 122 by the rivet 123 lies closer to one end of the member 120 than to the opposite end thereof. An adjusting screw 133 engages the longer cantilevered portion of the support member 120 and also the housing 122, and thus the left end of the bender unit 126 may be adjusted upwardly or downwardly by means of the screw 133.

The center electrode 127 may comprise a metallic material such as the iron-nickel alloy Invar having a thermal coefficient of expansion which is somewhat less than that of the titanate strip. When the bender unit 126 is heated locally or by ambient temperature sources, the electrode 127 will expand lengthwise less rapidly than the titanate strip, causing the bender unit to flex downwardly to actuate the relay. However, if a potential difference is also applied across the thickness dimension of the titanate strip 128, as by applying the voltage difference to the electrode 127 and to the silvered surface 132 of the titanate strip, the latter will contract lengthwise, against the reaction provided by the electrode, and the bender unit will tend to flex upwardly. Thus the degree and direction of flexing of the bender unit will be governed by the relative magnitudes of the potential difference and temperature applied thereto. It will be seen that the temperature at which relay actuation takes place may be accurately controlled by the magnitude of the potential difference applied across the titanate strip 128. Thus there is provided a novel electrothermal relay, the actuating temperatures of which may be controlled and varied by the magnitude of an applied potential difference.

The center electrode may alternatively comprise a metallic material such as brass having a thermal coefficient of expansion somewhat greater than that of the titanate strip. In such event, the electrode will expand lengthwise when the bender unit is heated more rapidly than the titanate strip, causing the unit to flex in the same direction as results from the application of the voltage difference across the titanate strip. Such a bender unit may also be used as a thermal element causing actuation of a relay as a result of temperature changes, with applied potential differences aiding thermally induced deflection of the bender element. As a result, the temperature at which relay actuation takes place may likewise be conveniently controlled by the magnitude of the applied potential difference.

The present invention also contemplates the provision of a relay having a bender element constructed of a titanate strip bonded onto a metallic electrode having a thermal coefficient of expansion equal to that of the titanate strip. Such a bender element is not affected by temperature changes and permits a saving of ceramic material, lending greater flexibility or compliance and better performance to the bender unit.

While I have illustrated and described certain preferred forms of my invention, I contemplate that various changes and modifications can be made therein without departing from the invention, the scope of which is indicated by the claims which follow.

I claim:

1. In a relay having at least two spaced contacts electrically connected to terminals carried by a base member, a movable contact, and a spring biased arm member carrying said movable contact; an elongated electrostrictive bender element having opposite ends; means for supporting the opposite ends of said bender element, said means including at least one elongated supporting member extending in the direction of said bender element and spaced therefrom, said member having a portion thereof fastened to a base member; adjustment means engaging said supporting member for adjusting the position of said bender element relative to said base member; connection means joined to the mid portion of said bender element and to said spring biased arm member; and electrical means for applying a voltage difference to said bender element, whereby bending displacement of the center portion thereof will effect actuation of said relay.

2. In a relay having at least two spaced contacts electrically connected to terminals carried by a base member, a movable contact, and a spring biased arm member carrying said movable contact: an elongated electrostrictive bender element, said element including a center electrode having ceramic strips joined to opposite side portions thereof; means for supporting the opposite ends of said electrode, said means including at least one elongated metallic strip extending in the direction of said bender element and spaced therefrom, said strip having a portion thereof fastened to a base member; adjusting means engaging said metallic strip for adjusting the position of said bender element relative to said base member; connection means joined to the center portion of said bender element and to said spring biased arm member; and electrical means for applying a voltage difference to said bender element, whereby bending displacement of the center portion thereof will effect actuation of said relay.

3. In a relay having at least two spaced contacts, a movable contact, and a spring biased arm member carrying said movable contact: an elongated electrostrictive bender element, said element including a center electrode having electrostrictive titanate strips joined to opposite side portions thereof; means for supporting the opposite ends of said electrode, said means having a portion thereof fastened to a base member; an adjustment device engaging said supporting means for adjusting the position of said bender element with respect to said arm member; connection means joined to said bender element and to said spring biased arm member; and electrical means for applying a voltage difference to said bender element, whereby bending displacement thereof will bring about actuation of said relay.

4. In a relay having at least two spaced fixed contacts, a movable contact, and a pivoted arm member carrying said movable contact: an elongated electrostrictive bender element having opposite ends; means for supporting the opposite ends of said bender element, said means including two supporting members extending along one side of said bender element and spaced therefrom, each of said supporting members being adapted to support one end of said bender element, said members being joined to a base member at one portion thereof; connection means joined to said bender element and to said pivoted arm member; and electrical means for applying a voltage difference to said bender element, whereby bending displacement thereof will bring about actuation of said relay.

5. In a relay having a pair of spaced fixed contacts, a movable contact, and a pivoted contact lever carrying said movable contact: an elongated electrostrictive bender element; a fixed member; support means for said bender element, said means including a first metallic strip fastened to said fixed member at a first point, said strip carrying a first support for said bender element, and a second metallic strip fastened to said fixed member at said first point, said second strip carrying a second support for said bender element; screw means engaging one of said strips for adjusting the spacing between said bender element and said fixed member; connection means joining the mid portion of said bender element and said pivoted contact lever; and electrical means for applying a potential difference to said bender element.

6. In a relay having a pair of spaced fixed contacts, a movable contact, and a pivoted contact lever carrying said movable contact: an electrostrictive bender element; a fixed member; support means for said bender element, said means including a first supporting strip fastened to said fixed member at a first point, and a second supporting strip fastened to said fixed member at said first point, said strips extending on one side of said bender element; adjustment means extending between said strips for adjusting the spacing between said bender element and said fixed member; connection means joined to the mid portion of said bender element and to said pivoted contact lever; and electrical means for applying a potential difference across portions of said bender element.

7. In a relay having a pair of spaced fixed contacts, a movable contact, and a contact lever carrying said movable contact: an electrostrictive bender element; support means for said bender element, said means including two supporting members extending along one side of said bender element adapted to support, respectively, two opposite edge portions of said bender element; a link member connected to said bender element and to the contact lever to transmit displacement of said bender element to said contact lever; and electrical means for applying a potential difference to said bender element to effect bending displacement of said bender element.

8. In a relay having a pair of spaced fixed contacts and a movable contact: an electrostrictive bender element having opposite ends; a base member; support means for said bender element engaging said opposite ends and fastened to said base member, said support means having resiliency and being arranged to normally apply a longitudinal stress to said bender element; a link member connected to said bender element and adapted to displace said movable contact on displacement of said bender element; and electrical means for applying a potential difference to said bender element to effect displacement thereof.

9. In a relay: a longitudinally elongated housing; pair of spaced fixed contacts; a pivoted arm carrying a movable contact, said arm extending in the longitudinal direction of said housing; an elongated bender unit disposed in the longitudinal direction of said housing, said bender unit including an elongated supporting member and at least one electrostrictive strip fastened to the side of said supporting member; support means adapted to freely support the ends of said bender unit; and a connecting link joined to the mid portion of said bender unit and to said pivoted arm.

10. In a relay: a longitudinally elongated housing; a pair of spaced fixed contacts; a pivoted arm carrying a movable contact, said arm extending in the longitudinal direction of said housing; an elongated bender unit disposed in the longitudinal direction of said housing, said bender unit including a center electrode having electrostrictive strips fastened to opposite sides thereof; support means adapted to support said bender unit; and a connecting link joined to the mid portion of said bender unit and to said pivoted arm.

11. In a relay: a longitudinally elongated housing; a pair of spaced fixed contacts; a pivoted arm carrying a movable contact, said arm extending in the longitudinal direction of said housing; an elongated electrostrictive bender unit disposed in the longitudinal direction of said housing; means adapted to freely support the ends of said bender unit; conection means joined to the mid portion of said bender unit and to said pivoted arm; and electrical means for applying a potential difference to said bender unit.

12. In a relay: a longitudinally elongated housing: a pair of spaced fixed contacts; a pivoted arm carrying a movable contact, said arm extending in the longitudinal direction of said housing; an elongated bender unit disposed in the longitudinal direction of said housing, said bender unit including an elongated supporting member and at least one electrostrictive strip fastened to the side of said supporting member; support means adapted to freely support the ends of said bender unit; a connecting link joined to the mid portion of said bender unit and to said pivoted arm, and electrical means for applying a potential difference between opposite faces of said electrostrictive strip.

13. In a relay: a pair of spaced fixed contacts; a pivoted arm carrying a movable contact, said arm being resiliently biased; an elongated bender unit, said bender unit including a supporting member and at least one electrostrictive strip fastened to one side of said supporting member; support means adapted to freely support the ends of said bender unit; a connecting member joined to the mid portion of said bender unit and to said pivoted arm; and electrical means for applying a potential difference between opposite faces of said electrostrictive titanate strip.

14. An actuator for generating small movements, which includes: a bender unit comprising an elongated support member and at least one electrostrictive strip joined to one face of said support member; means for freely supporting the opposite ends of said bender unit, said means including a second support member disposed on one side of said bender unit and spaced therefrom, said second support member having one portion thereof joined to a fixed base; an actuating member joined to a portion of the bender unit lying within the center one-half of the length thereof; and electrical means for applying a potential difference across the thickness dimension of said electrostrictive titanate strip.

15. In an actuator for generating small linear movements: a bender unit including an elongated electrode having electrostrictive strips joined to opposite faces thereof; means for freely supporting the opposite ends of said bender unit, said means including a support member disposed on one side of said bender unit and spaced therefrom, said second support member having one portion thereof joined to a fixed base; an actuating member joined to the mid portion of said bender unit; and electrical means for applying a potential difference across the thickness dimension of one of said electrostrictive strips.

16. In a relay: a pair of spaced fixed contacts; a pivoted arm carrying a movable contact, said arm being resiliently biased; a pair of elongated bender units, each of said units including a supporting member and at least one electrostrictive strip joined to one side of said member; support means adapted to freely support the ends of said bender units; a pair of connecting members each of which is operatively connected to one of said bender units and to said pivoted arm, said connecting members being joined to said pivoted arm on opposite sides of the pivotal axis of said arm and equidistant therefrom; and electrical means for applying a potential difference across the thickness dimensions of said strips.

17. In an improved thermal relay: a pair of spaced fixed contacts; a pivoted arm carrying a movable contact, said arm being resiliently biased; an elongated bender unit, said unit including a supporting member and at least one electrostrictive strip joined to one side of the supporting member, said supporting member and said titanate strip having different thermal coefficients of expansion; support means adapted to freely support the ends of said bender unit; a connecting member joined to the mid portion of said bender unit and to said pivoted arm; and electrical means for applying a potential difference across said titanate strip to control flexing thereof caused by temperature differences.

18. In a relay: a pair of spaced fixed contacts; a pivoted arm carrying a movable contact, said arm being resiliently biased; an elongated bender unit, said unit including a supporting member and at least one electrostrictive strip joined to one side of the supporting member, said member and said strip having the same thermal coefficients of expansion; support means adapted to freely support the ends of said bender unit; a connecting member joined to said bender unit and to said pivoted arm; and electrical means for applying a potential difference across said strip.

19. In an actuator for generating small linear movements: an elongated electrostrictive bender unit; a base; means on the base freely supporting opposite ends of said bender unit, said means having resiliency and being arranged to normally exert a longitudinal stress on said bender unit; an actuating member joined to the mid portion of said bender unit; and electrical means for applying a potential difference to said bender unit to effect displacement thereof.

20. In an electrical relay, in combination: means forming an elongated electrostrictive bender unit including at least one electrostrictive element and electrical contacts operable thereby; means supporting the ends of said unit, said supporting means having resiliency allowing flexing of said unit, said resilient means being arranged to normally apply a longitudinal stress to said unit, said unit being operable to assume a position bowed out from a line connecting the points of support of its end, and the said first means embodying the characteristic that upon the application of voltage across said element, the said unit moves between first and second positions with a snap action.

21. In apparatus of the character described, in combination: means comprising a metallic strip having bonded thereto an electrostrictive strip adapted to deform upon the application of voltage across the strip, said first means including mounting means and the assembly having the characteristic that the strips are operable to move between first and second positions with a snap action; and the two strips having different coefficients of thermal expansion whereby the assembly is operative to snap from one position to another at a predetermined temperature dependent upon the voltage applied across the electrostrictive strip.

22. The structure of claim 21 wherein the first means includes over-center mechanism for providing the snap characteristic.

23. The structure of claim 21 wherein the strips have the same coefficient of thermal expansion whereby the assembly is responsive only to the voltage applied across the electrostrictive strip.

24. In an electrical relay, in combination; means forming an elongated electrostrictive unit including an electrostrictive element adapted to deform upon the application of a voltage across the unit; and electrical contacts operable thereby; means supporting the ends of the unit comprising resilient members engaging the unit, said resilient members being arranged to normally apply a longitudinal stress to said unit, said unit being operable to assume a position bowed out from a line connecting the points of support of its ends; and the said first means embodying the characteristic that upon the application of voltage across said element, the unit moves between first and second positions with a snap action, the said electrical contacts being associated with an intermediate point of unit.

25. In an electrical relay, in combination: means forming an elongated electrostrictive bender unit including at least one electrostrictive element and electrical contacts operable thereby; means supporting the ends of said unit, said supporting means having resiliency allowing flexing of said unit, said unit being operable to assume a position bowed out from a line connecting the points of support of its ends, and the said first means embodying the characteristic that upon the application of voltage across said element, the said unit moves between first and second positions with a snap action, said first means including overcenter mechanism to provide the snap action.

26. In an electrical relay, in combination: means forming an elongated electrostrictive bender unit including at least one electrostrictive element and electrical contacts operable thereby; means supporting the ends of said unit, said supporting means having resiliency allowing flexing of said unit, said unit being operable to assume a position bowed out from a line connecting the points of support of its ends, and the said first means embodying the characteristic that upon the application of voltage across said element, the said unit moves between first and second positions with a snap action, the said first means including overcenter mechanism to provide the snap action, the moving parts thereof having their mass evenly distributed about the center of movement.

27. In an electrical relay, in combination: means forming an elongated electrostrictive bender unit including at least one electrostrictive element and electrical contacts operable thereby; means supporting the ends of said unit, said supporting means having resiliency allowing flexing of said unit, said unit being operable to assume a position bowed out from a line connecting the points of support of its ends, and said first means embodying the characteristic that upon the application of voltage across said element, the said unit moves between first and second positions with a snap action, the said bender unit including a temperature responsive metal strip having a different coefficient of thermal expansion than the electrostrictive element whereby the contacts are operable at a predetermined temperature affecting said unit governed by the potential applied across said element.

28. In an electrical relay, in combination: means forming an elongated electrostrictive bender unit including at least one electrostrictive element and electrical contacts operable thereby; means supporting the ends of said unit, said supporting means having resiliency allowing flexing of said unit, said unit being operable to assume a position bowed out from a line connecting the points of support of its ends, and the said first means embodying the characteristic that upon the application of voltage across said element, the said unit moves between first and second positions with a snap action, the said unit including a metal strip having the same coefficient of thermal expansion as said electrostrictive element.

29. In an electrical relay, in combination: means forming an elongated electrostrictive unit including an electrostrictive element adapted to deform upon the application of a voltage across the unit; electrical contacts operable thereby; means supporting the ends of the unit comprising resilient members engaging the unit, said resilient members being constructed and arranged to normally apply a compressive longitudinal stress to said unit, said unit being operable to assume a position bowed out from a line connecting the points of support of its ends; and the said first means embodying the characteristic that upon the application of voltage across said element, the unit moves between first and second positions with a snap action, the said electrical contacts being associated with an intermediate point of the unit.

30. In apparatus of the character described, in comination: means comprising an electrostrictive strip adapted to deform upon the application of voltage across the strip, said electrostrictive strip having associated therewith and closely juxtaposed thereto a metallic strip, mounting means for said first means and electrical contacts operable thereby, and the said two strips having different coefficients of thermal expansion whereby the assembly is operative to actuate the electrical contacts at a predetermined temperature dependent upon the voltage applied across the electrostrictive strip.

31. In apparatus of the character described, in combination: means comprising an electrostrictive strip adapted to deform upon the application of voltage across the strip, said electrostrictive strip having associated therewith and closely juxtaposed thereto a metallic strip, mounting means for said first means and electrical contacts operable thereby, and the said two strips having the same coefficient of thermal expansion whereby the assembly is operative to actuate the said contacts in response only to the voltage applied across the electrostrictive strip irrespective of the temperature effecting the strips.

References Cited in the file of this patent

UNITED STATES PATENTS

| | | |
|---|---|---|
| 1,733,085 | Thomas | Oct. 22, 1929 |
| 2,207,539 | Gravley | July 9, 1940 |
| 2,332,518 | Koci | Oct. 26, 1943 |
| 2,387,108 | Arndt et al. | Oct. 16, 1945 |
| 2,466,053 | Shaper et al. | Apr. 5, 1949 |
| 2,471,967 | Mason | May 31, 1949 |
| 2,497,108 | Williams | Feb. 14, 1950 |
| 2,640,889 | Cherry | June 2, 1953 |
| 2,706,326 | Mason | Apr. 19, 1955 |
| 2,714,642 | Kinsley | Aug. 2, 1955 |

FOREIGN PATENTS

| | | |
|---|---|---|
| 201,679 | Great Britain | Aug. 9, 1923 |